DISPLAY SYSTEM

Filed Jan. 15, 1968

INVENTORS.
DONALD J. CHESAREK
ZACK D. REYNOLDS

BY Vincent V. Cleary
ATTORNEY

United States Patent Office 3,476,973

Patented Nov. 4, 1969

3,476,973

DISPLAY SYSTEM

Donald J. Chesarek and Zack D. Reynolds, San Jose, Calif., assignors to International Business Machines Corporation, Armonk, N.Y., a corporation of New York Filed Jan. 15, 1968, Ser. No. 697,733
Int. Cl. H01j *29/70*
U.S. Cl. 315—18 3 Claims

ABSTRACT OF THE DISCLOSURE

An electron beam deflection system for a cathode ray tube which has its beam gated on by a rectangular pulse. Two sets of transversely disposed deflection coils are employed to horizontally and vertically deflect the electron beam. Both the vertical and the horizontal deflecting circuits for these coils include means for generating a linear beam deflecting portion or waveform. This deflection portion is added to a rectangular pulse and the resulting waveform is applied to the corresponding horizontal and vertical deflection coils. The resultant wave from this addition is a waveform having a center linear beam deflecting portion with a sharp leading edge preceding this deflecting portion and a sharp trailing edge immediately after said beam deflecting portion. As a result of the sharp leading and trailing edges, the inductive characteristics of the deflection circuits and coils are substantially overcome so as to result in the beam velocity at the beginning and end of a trace to be substantially equal to the beam velocity throughout the trace.

BACKGROUND OF THE INVENTION

Field of the invention

A deflection system for a cathode ray tube.

Description of the prior art

In a conventional cathode ray tube deflection circuit a sawtooth waveform is applied to the deflection coils. Due to the inductive characteristics of the deflection coils and the deflection circuit, the velocity of the beam at the beginning and the end of the trace is substantially less than other portions or center portion of the trace. This low velocity results in bright spots occurring at the beginning and the end of every trace.

SUMMARY OF THE INVENTION

It is therefore an object of the invention to provide a new and improved deflection system for deflecting the electron beam of a cathode ray tube.

A further object of the invention is the provision of a beam deflection circuit or system which deflects the electron beam of a cathode ray tube at a relatively constant velocity throughout the trace of the electron beam.

A still further object of the invention is to provide a new and improved deflection system which is capable of deflecting an electron beam of a cathode ray tube so as to minimize bright spots that normally occur at the beginning and end of an electron beam trace.

The above objects of the present invention are accomplished by a deflecting system which includes a waveform generator that generates a deflecting current waveform having a beam deflecting portion with a sharp leading edge immediately preceding said beam deflecting portion and a sharp trailing edge immediately after said beam deflecting portion. This waveform is applied to the deflecting coils of the deflection system. Due to the sharp leading and trailing edges, the inductive effect of the deflection coils is overcome, which inductive effect of the deflection coils normally produces slower beam velocity at the beginning and end of a beam trace.

General description

Figures 1, 2, 3, 4, 5:
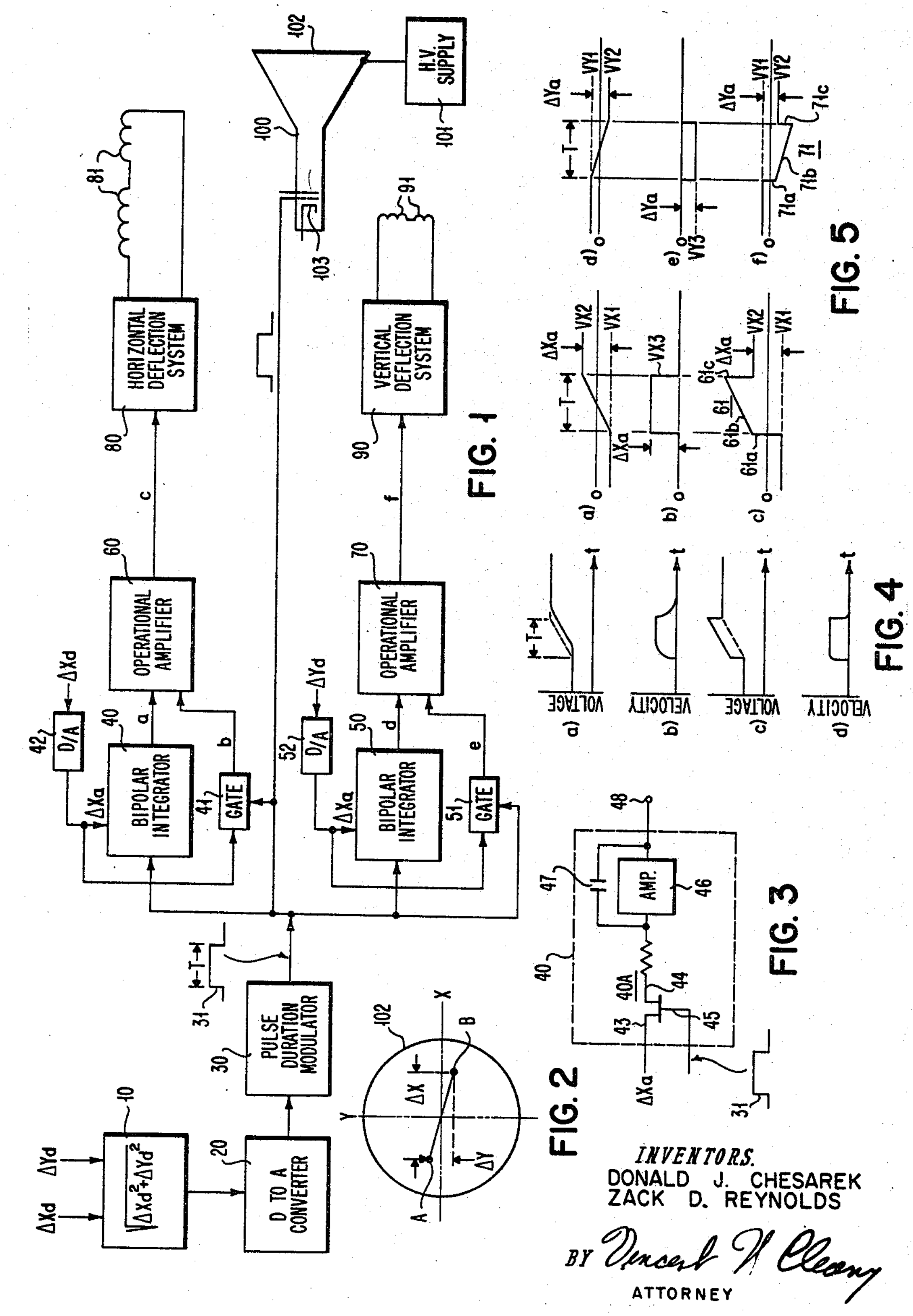
FIGURE 1 illustrates a cathode ray tube deflection system embodying the invention.
FIGURE 2 illustrates an example of the cathode ray tube display of the deflection system shown in FIGURE 1.
FIGURE 3 illustrates an example of a bipolar integrator employed in the deflection system in FIGURE 1.
FIGURE 4 illustrates curves useful in describing the embodiment illustrated in FIGURE 1, and FIGURES 5(*a*) through 5(*f*) represent waveforms at points *a* through *f* respectfully in FIGURE 1 for a desired deflection, by way of example, as shown in FIGURE 2.

In the deflection system illustrated in FIGURE 1, a rectangular beam gating pulse 31 is generated having a time duration which represents the time length of a desired beam trace. This pulse gates on the beam of CRT 100. In addition, this pulse turns on $\Delta X$ and $\Delta Y$ bipolar integrators 40 and 50. These integrators provide a ramp or voltage waveform during the duration of pulse 31, to deflect the beam from one position to another on the screen of the CRT 100.

The waveforms developed by integrators 40 and 50, however, are added to the rectangular waveforms. This results in deflection waveforms such as illustrated by numerals 61 and 71 in FIGURES 5(*c*) and (*f*) having a central beam deflecting portion with a vertical or sharp leading edge and a vertical or sharp trailing edge. Prior art deflecting waveforms utilized only the central beam deflection portion. Since the deflection is done through the inductance coils, the conventional electron beam has a relatively low velocity at the beginning and the end of the beam trace. In the present device it has been discovered that by utilizing a deflection waveform with sharp leading and trailing edges at either end of the deflection portion, results in a more uniform velocity of the beam during a trace with the result that the bright spots at the beginning and the end of the trace are minimized.

DETAILED DESCRIPTION

In the following description $\Delta X$ is the desired distance of horizontal deflection of the electron beam from one point to another (e.g., from point A to point B). $\Delta Y$ is the desired distance of vertical deflection of the electron beam from one point to another (e.g., from point A to point B). $\Delta X_d$ is a digital representation of $\Delta X$ and $\Delta Y_d$ is a digital representation of $\Delta Y$. $\Delta X_a$ is an analog representation of $\Delta X$ and $\Delta Y_a$ is an analog representation of $\Delta Y$.

In the embodiment illustrated in FIGURE 1, digital information ($\Delta Y_d$ and $\Delta Y_d$) representing a desired change of position or movement of the beam of CRT 100 and are applied to a calculator 10. Unit 10 derives the square root of the sum of the squares of $\Delta Y_d$ and $\Delta X_d$ (i.e., $\sqrt{\Delta X_d^2+\Delta Y_d^2}$). The digital output of unit 10 representing the square root of the sum of the squares of $\Delta X_d$ and $\Delta Y_d$ is applied to a digital to analog converter 20. The output of converter 20 thereby provides an analog voltage having an amplitude which is a function of the square root of the sum of the squares of $\Delta X_d$ and $\Delta Y_d$. This voltage therefore is a function of the desired time and/or distance of beam travel.

The analog output of converter 20 is applied to a pulse duration modulator 30 which produces a fixed amplitude rectangular pulse 31 having a time duration T which is a function of the amplitude of the voltage at the output of converter 20, (i.e., a function of the desired time or distance of beam travel or deflection). The rectangular pulse 31 is applied to the first grid of CRT 100 having a high voltage supply 101 and a target 102. In so doing, an electron beam is emitted from cathode 103 to target 102 for the duration of pulse 31 for a time T.

The rectangular pulse 31 is applied to bipolar integrators 40 and 50 as well as to gates 41 and 51. The pulse 31 enables an output from integrators 40 and 50 and gates 41 and 51 but only for the duration of pulse 31.

As shown in FIGURE 1, a digital to analog converter 42 is employed which converts $\Delta X_d$ to $\Delta X_a$. The output of converter ($\Delta X_a$) is applied to gate 41 as well as the source 43 of a field effect transistor 40A having a source 43, drain 44. The drain 44 is connected to a standard integrator based on an operational amplifier 46 and a charging capacitor 47.

Bipolar integrator 40, as the bipolar integrator 50, has a first input which receives analog information, ($\Delta X_a$, $\Delta Y_a$) which is a voltage, the amplitude of which is a function of the desired distance of deflection along the respective X or Y coordinate. As stated above, converter 42 applies an analog voltage to the source 43 which voltage is a function of the desired horizontal or X deflection of the CRT beam. Thus the rate of charging of the capacitor 47 will vary as a function of the desired distance of travel of the beam along the X axis. Furthermore, the polarity of charging of the capacitor 47 will depend on the polarity of the desired deflection of the beam along the X axis. These axes (X and Y) are shown, by way of example, in FIGURE 2. The second input of the integrator 40 is the gate 47 of the transistor 40A, which has the gating pulse 31 applied thereto. Thus, the transistor 40A is turned on a time duration T which represents the time it will take the electron beam to traverse the desired deflection distance. Thus, a deflecting voltage is developed by integrator 40 similar to that shown in dotted lines in FIGURES 5(*a*) and (*d*) and the dotted line in FIGURE 4(*a*) and labelled "Input Voltage." This input voltage waveform is developed similarly and is similar to conventional deflection waveforms.

In the present embodiment, a summing operational amplifier 60 is employed, having the output of gate 41 and the output of the integrator 40 connected thereto. As can be seen, the output of gate 41 is a rectangular pulse waveform having an amplitude which is a function of $\Delta X_a$ and/or the desired horizontal deflection. The summing results in the waveform being added to the waveform developed by integrator 40 from gate 41. This summing by amplifier results in waveform, for example, having a sharp leading edge 61*a* developed as a result of the sharp leading edge of the pulse from gate 41 (FIGURE 5(*b*)), a center deflecting portion 61*b* having a slope the same as the slope of the waveform developed by integrator 40. In addition, the waveform includes a sharp trailing edge 61*c* which is developed as a result of the sharp trailing edge of the pulse from gate 41. This waveform is applied to a horizontal deflection system 80 and to horizontal deflection coils 81 for the CRT 100. It will be noted by example in FIGURE 5 that after the waveform is developed by the above summation the current level to the operational amplifier 60 and thusly to deflection coils 81 has been changed from a first level VX1 to a second level VX2. This change is illustrated in FIGURE 5 as $\Delta X_a$ which is an analog change that varies as a function of the desired beam position changes along the X axis.

The pulse 31 is also applied to one input (the gate of an FET) of integrator 50 and a gate 51. At the other input of integrator 50, an analog signal ($\Delta Y_a$) is applied from a D to A converter 52. The bipolar integrator 50 is identical to the above bipolar integrator 40, as illustrated in FIGURE 3. In the digital $\Delta Y_a$ information is applied to a D to A converter 52 which output ($\Delta Y_a$) is connected similarly to the source of an FET (as well as gate 51). Similarly, the pulse 31 is applied to the gate of an FET similarly as 31 is applied to the gate 45 of the FET of integrator 40. In addition, the FET is connected to a conventional integrator such as amplifier 46 and charging capacitor 47.

Thus, a waveform is developed by integrator 50 having a time width T similar to, for example, the waveform illustrated in FIGURE 4(*a*) and/or 5(*d*). The output of integrator 50 is connected to a summing operational amplifier 70. The output of gate 51 is also connected to the input of amplifier 70. The output of gate 51 provides a rectangular pulse coincident with pulse 31 and having an amplitude that is a function of $\Delta Y_a$. The summing by amplifier 70 results in, for example, a waveform 71 having a sharp leading edge 71*a* due to the sharp leading edge of the pulse from gate 51 and a central deflecting portion 71*b* having the same angle as the waveform developed by integrator 50. In addition, this pulse has a sharp trailing edge 71*c* as a result of the sharp trailing edge of the pulse from gate 51.

The resultant summed waveform is applied to a vertical deflection system 90, and thence to the vertical deflecting coils 91 for CRT 100. It will be noted in the example illustrated in FIGURE 5(*f*) that as a result of the summed waveform 71 (the addition of the waveforms shown in FIGURES 5(*d*) and (*e*)) the current level into the deflection current 90 and thus the coils 91 had been lowered from a level VY1 to a level VY2. This change in level shown as $\Delta Y_a$ in FIGURE 5 is an analog indication of the charge position of the beam along the Y axis.

The waveforms of the drawings should be viewed as a set of normalized waveforms (i.e., scaled in terms of both time and amplitude). If we consider the amplitude scaling only, we note, and as stated above, that as the magnitude of $\Delta Y_d$ increased, the slope of the waveform of FIGURE 4*a* increases. If the input to an integrator is A then the output is A*t*. The dominant frequency characteristics of the Deflection System do not change with input signal amplitude. Since the absolute error, the difference between the ideal waveform and that achieved with a fixed deflection system is a function of the slope of the input waveform, the compensating signal, FIGURES 5(*b*) and (*e*), must be scaled by the slope at the output of the integrator. This is done in the illustrated embodiment by $\Delta X_a$ being applied to and passed by gate 41 and by $\Delta Y_a$ being applied to and passed by gate 51.

FIGURE 4(*a*) illustrated in dotted lines, a conventional input deflection voltage and in dotted lines the resulting deflection field. FIGURE 4(*b*) illustrates the beam velocity effected by the voltage and field in FIGURE 4(*a*). It will be noted that the velocity at the beginning and the end of the beam trace is substantially lower than the middle of the pulse for a substantial part of the trace. Consequently, noticeable bright spots appear at the beginning and end of the trace.

FIGURE 4(*c*) illustrates an example of the deflection voltage waveform produced by the embodiment illustrated in FIGURE 1. FIGURE 4(*d*) illustrates the beam velocity produced by the waveform in FIGURE 4(*c*). It is clear from these curves that the beam trace resulting from this waveform will substantially reduce the above discussed bright spots at the beginning and end of a conventional trace.

OPERATION

By way of example, assume that it is desired to move the beam from a point A (FIGURE 2) to a point B. The beam being at point A, the voltage across coils 81 is VX1 as shown in FIGURE 5(*a*) and the voltage across coils 91 is VY1 as shown in FIGURE 5(*d*).

To move the beam to point B some external means not illustrated, binary weighted or digital information is developed illustrated as $\Delta X_d$, which represents digitally the required horizontal deflection of the CRT beam along the X axis to move the beam to point B. Similar information, $\Delta Y_d$, is developed which is a digital indication of the required vertical deflection of the electron beam along the Y axis to move the beam to B. These two inputs are applied to a unit 10 which has as its output the square root of the sum of the squares of $\Delta X_d^2$ and $\Delta Y_{d2}$. Unit 10 is any unit which can obtain a binary output that is a function of the square root of the sum of the squares of two binary or digital numbers. An example of such a unit would be what is commonly known as a CPU (Central Processing Unit) or an ALU (Arithmetic Logic Unit). The output of unit 10 therefore is a digital output which varies as a function of the desired deflection distance and the time for such deflection of the beam of the CRT 100. The digital output of unit 10 is converted to analog form by a D to A converter 20 and passed to a pulse duration modulator 30 which produces rectangular pulse 31 having a time duration T whose value is a function of the required deflection distance of the beam of the CRT as well as the time required for deflecting the beam to point B.

The bipolar integrator 40 has applied thereto $\Delta X_a$ from converter 42 as well as rectangular pulse wave 31. As such, integrator 40 in a conventional manner will produce a waveform similar to the dotted line waveform in FIGURE 5(*a*) with an angularly disposed portion having a time width T and with a beginning voltage of VX1 and a final voltage of VX2. In the present invention this waveform is added to the rectangular pulse shown in FIGURE 5(*b*) which has an amplitude that is a function of $\Delta X_a$. As a result of this addition, a waveform 61 appears at the output of amplifier 60 as shown in FIGURE 5(*c*). This waveform 61 has a sharp vertical edge 61*a* and a sharp trailing edge 61*c*. This waveform is then applied through deflection system 80 to the horizontal deflection coils 81.

The bipolar integrator 50 has the digital signal $\Delta Y_a$ applied thereto from converter 52, as well as the beam gating rectangular waveform 31. This thereby produces the waveform illustrated in FIGURE 5(*d*) with a beginning voltage of VY1 and a final voltage of VY2. Concurrently, the rectangular pulse illustrated in FIGURE 5(*e*) (negative going) is developed having an amplitude that is a function of $\Delta Y_a$. These waveforms are summed in amplifiers 70 to produce pulse 71 having a sharp leading edge 71*a*, a central deflecting portion 71*b* and a sharp trailing edge 71*c*. This waveform results in a voltage level change across coils 91 from VY1 to VY2. $\Delta Y_a$ is a measure of this voltage change and of the distance of the required deflection of the beam along the Y axis.

It will be understood that only one waveform is shown, although as a practical matter, these waveforms will be repeated probably for retention of the display on the CRT 100 or be re-traced to produce this display. For purposes of simplicity, however, only one trace of the beam is shown by way of example.

As stated above, FIGURE 4(*a*) illustrates a conventional deflection voltage in dotted lines which develops a deflection field shown in solid lines in FIGURE 4(*a*). As a result of this deflection voltage, a beam velocty fior the electron beam is as illustrated in FIGURE 4(*b*). It will be noted that the leading and trailing portions of this beam velocity are considerably different than the main portion of the beam velocity. That is to say, the starting and ending velocity of the beam trace is relatively slow. Due to this low velocity at the beginning and end of the trace, bright spots result.

In the applicant's deflection system, as illustrated the deflection waveform shown in dotted lines in FIGURE 4(*c*) (as well as FIGURE 5(*c*) and FIGURE 5(*f*)) is developed. This waveform in FIGURE 4(*c*) produces a beam velocity as illustrated in FIGURE 4(*d*). Thus, it is noted that the beam velocity, as well as the velocity developed by waveforms of FIGURES 5(*c*) and 5(*f*), shown in FIGURE 4(*d*) is more uniform throughout the trace than the beam velocity of the conventional system, as illustrated in FIGURE 4(*b*). As a result of this, the bright spots normally resulting in a vector electron trace are minimized. Further, it will be noted that this new modified waveworm is developed only with a minimum amount of additional connections to be conventional deflection system.

While the invention has been particularly shown and described with reference to preferred embodiments thereof, it will be understood by those skilled in the art that the foregoing and other changes in the form and details may be made therein without departing from the spirit and scope of the invention.

We claim:

1. An electromagnetic deflection system for selectively deflecting the electron beam of a cathode ray tube from a coordinate point X1, Y1 on a target to a point X2, Y2 on said target;
- a horizontal deflection coil for deflecting said beam in an horizontal X direction;
- a vertical deflection coil for deflecting said beam in a vertical Y direction;
- gating means for selectively gating said electron beam on time period having a length T which varies as a function of the distance between the point X1, Y1 and point X2, Y2;
- first generator means generating a first rectangular pulse coincident in time with said time period and having an amplitude which varies as a function of X1–X2;
- second generator means generating a second rectangular pulse coincident in time with said time period and having an amplitude which varies as a function of Y1–Y2;
- means developing a horizontal beam deflecting waveform having an amplitude at the beginning of said time period which is a function of X1 which amplitude linearly increases to a value at the end of said time period which is proportional to X2;
- means developing a vertical beam deflecting waveform having an amplitude at the beginning of said time period which is a function of Y1, which amplitude linearly increase to a value at the end of said time period which is a function to Y2;
- means adding said first rectangular pulse and said horizontal deflecting waveform and applying the resultant waveform to said horizontal deflection coils, and
- means adding said second rectangular pulse and said vertical deflecting waveform and applying the resultant waveform to said vertical deflection coils.

2. A deflection system as set forth in claim 1 wherein said gating means produces rectangular gating pulses having time length T which varies as a function of the distance between coordinate X1–Y1 and point X2–Y2, and
- means applying said gating pulses to gate the electron beam on during the duration of said gating pulses.

3. Deflection system as set forth in claim 2 including first digital to analog converter means generating, in response to a digital signal, an analog signal having an amplitude which varies as a function of X1–X2;
- means applying said analog signal to said first generator means with the output thereof varying as a function of said analog signal;
- second digital to analog converter means generating, in response to a digital signal, a second analog signal having an amplitude which varies as a function of Y1–Y2;

means applying said second analog signal to said second generator means with the output thereof having an amplitude which varies as a function of said second analog signal, and means applying said gating pulses to said first and said second generator means to gate on the output thereof in response to said gating pulses.

References Cited

UNITED STATES PATENTS

| | | | |
|---|---|---|---|
| 2,419,118 | 4/1947 | Christaldi | 315—22 |
| 2,884,562 | 4/1959 | Solow | 315—22 |
| 3,070,727 | 12/1962 | Birt | 315—27 |
| 3,174,073 | 3/1965 | Massman | 315—27 |
| 3,281,623 | 10/1966 | Peterson | 315—22 |
| 3,341,716 | 9/1967 | Chilton | 315—27 |
| 3,394,366 | 7/1968 | Dye | 315—18 |
| 3,398,318 | 8/1968 | Bazin | 315—27 |

RODNEY D. BENNETT, Jr., Primary Examiner

J. G. BAXTER, Assistant Examiner

U.S. Cl. X.R.

315—27